United States Patent [19]

Frederick et al.

[11] 4,132,191
[45] Jan. 2, 1979

[54] APPARATUS FOR COATING A PORTION OF A BOTTLE

[75] Inventors: Judson G. Frederick; Benjamin Mercer, Jr., both of Toledo; John E. Poole, Holland, all of Ohio

[73] Assignee: Owens-Illinois, Inc., Toledo, Ohio

[21] Appl. No.: 869,570

[22] Filed: Jan. 16, 1978

Related U.S. Application Data

[62] Division of Ser. No. 806,138, Jun. 13, 1977, Pat. No. 4,092,447.

[51] Int. Cl.² .............................................. B05C 5/02
[52] U.S. Cl. ................................... 118/409; 118/426; 118/503; 198/426
[58] Field of Search ............... 118/230, 241, 319, 239, 118/503, 410, 426, 416, 425, 409; 427/286; 198/379, 408, 409, 412, 418, 426, 429, 430; 214/1 BD, 1 BC, 91 A, 91 R; 101/38 R, 38 A, 39, 40; 65/239, 241, 60 R, 60 A, 60 B, 60 C, 60 D

[56] References Cited

U.S. PATENT DOCUMENTS

| | | | |
|---|---|---|---|
| 3,237,555 | 3/1966 | Jones et al. | 101/38 R |
| 3,760,968 | 9/1973 | Amberg et al. | 215/12 R |
| 3,950,199 | 4/1976 | Lucas | 118/416 X |

*Primary Examiner*—John McIntosh
*Attorney, Agent, or Firm*—D. T. Innis; Myron E. Click; David H. Wilson

[57] ABSTRACT

Method and apparatus for handling a plurality of glass containers moving on a conveyor at spaced intervals to a coating application area where three containers as a group are simultaneously grasped about their side wall and retracted laterally from the surface of the conveyor. This group of containers is then moved through a 90° arc such that the containers exhibit horizontal axes one above the other. After the articles are turned to the horizontal, they are moved into position between three heel and neck-engaging chucks carried by an indexible turret. The bottles are released to the chucks which are cam actuated in timed relationship with respect to the grasping means so that the grasping means will release the containers or bottles to the chucks. With the chucks holding the bottles in horizontal position, the turret rotates about a horizontal axis parallel to the axes of the bottles through an arc of 90° and presents the chucks in a horizontal line at the bottom of the turret. In this position, a shoulder coater mechanism, which is also cam operated, will be elevated into contact with the shoulder portion of the containers and the containers rotated through at least 360° of rotation about their axes. The coating mechanism is retracted and the turret indexed through another 90° arc will bring the containers to the unloading side of the machine where they are grasped by a second set of three side wall-engaging jaws or grasping means. After grasping the containers and pulling back from the chucks the grasping means are rotated about a horizontal axis normal to the axes of the containers so as to revert the containers to an upright position. When in this position, the grasping means are moved forward, at which time they release the containers to an exit or continuously moving conveyor moving away from the application area.

11 Claims, 11 Drawing Figures

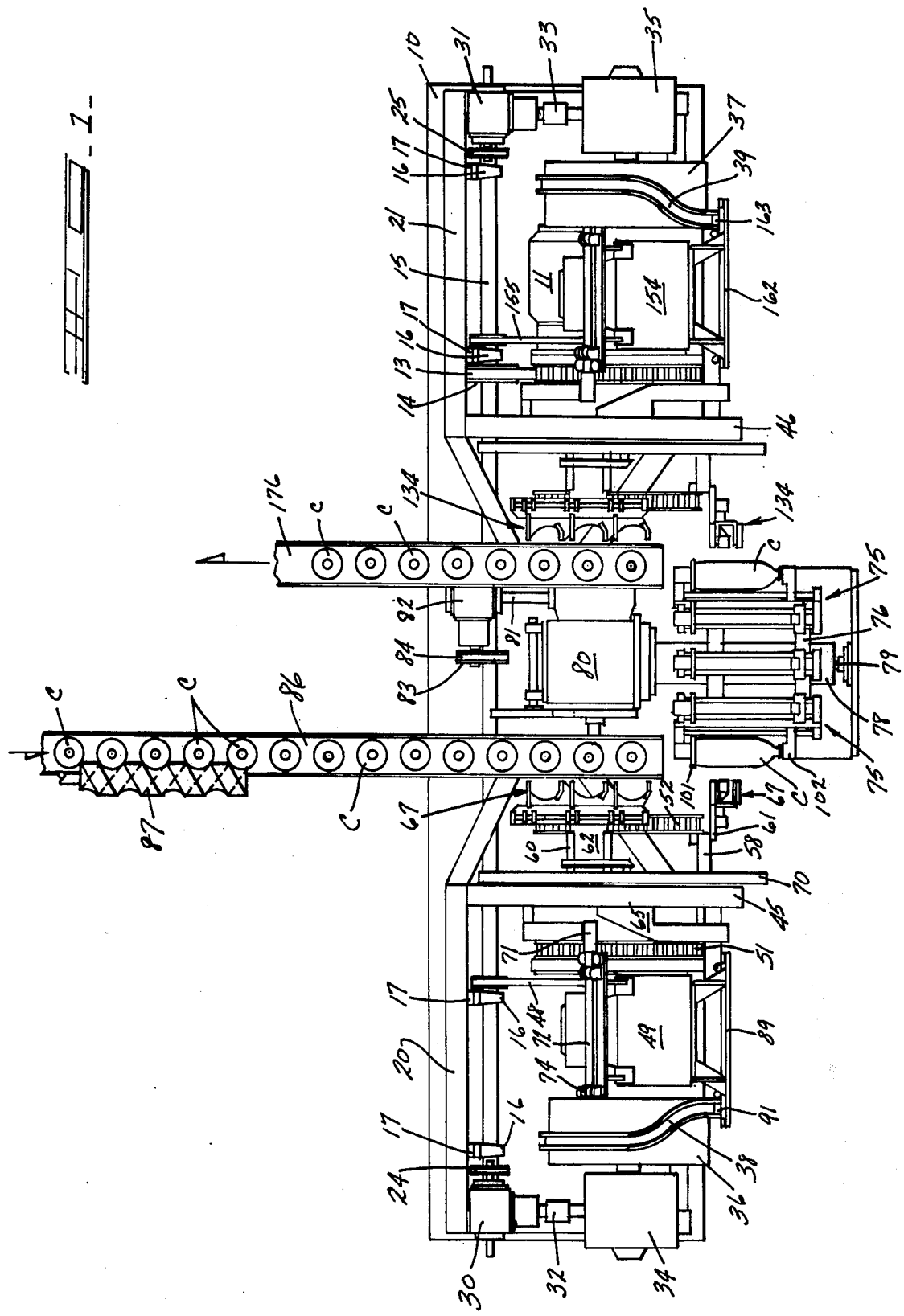

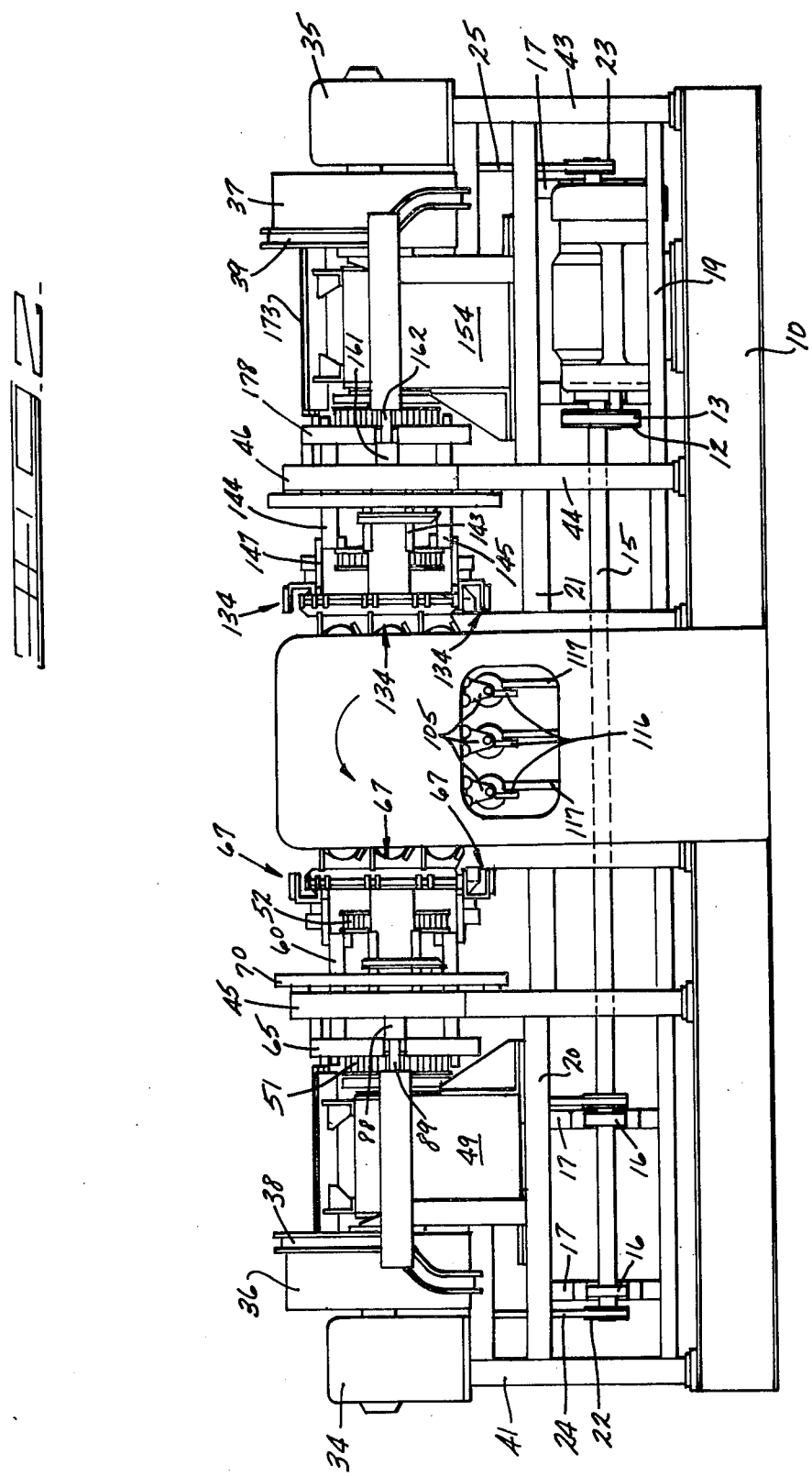

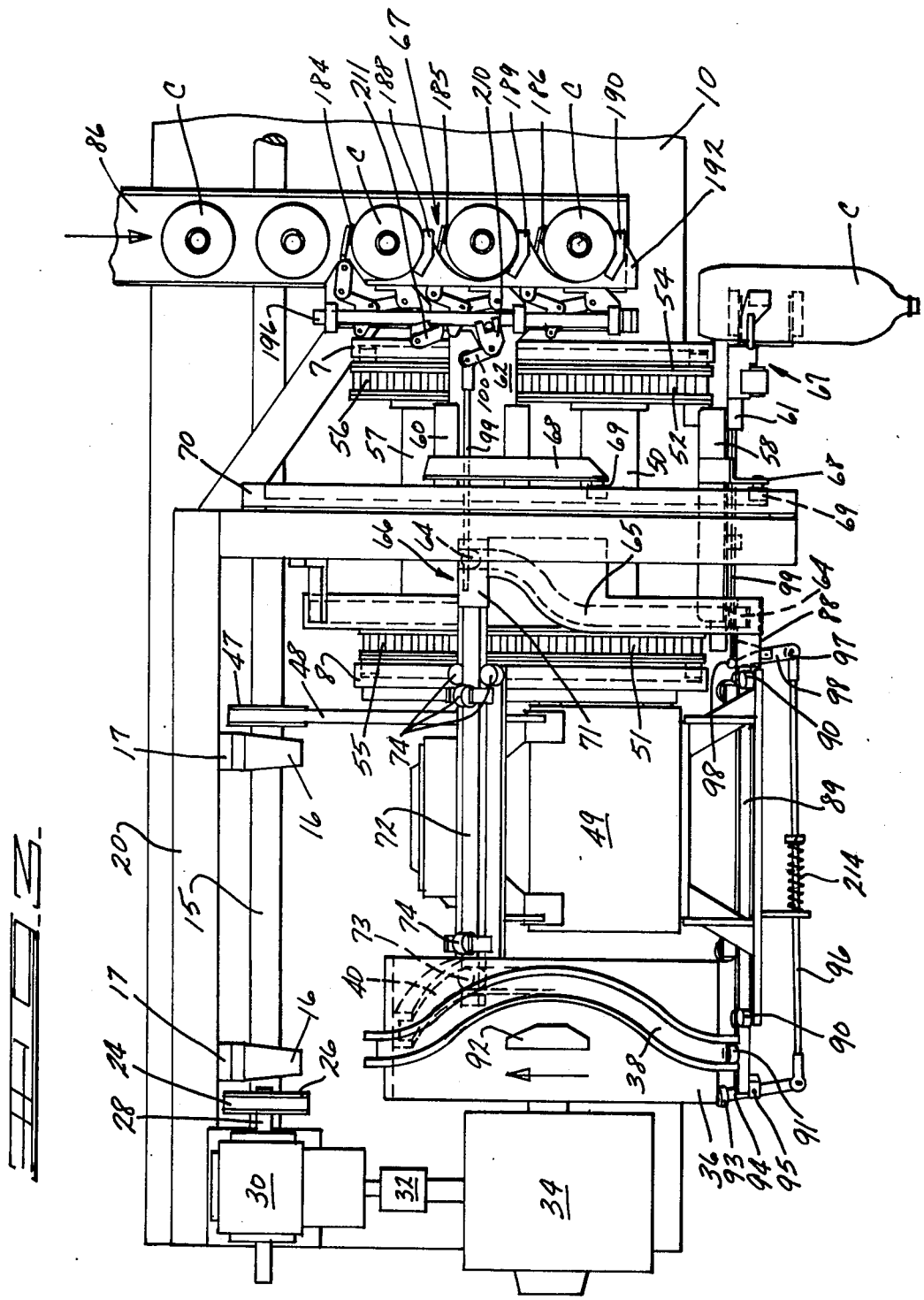

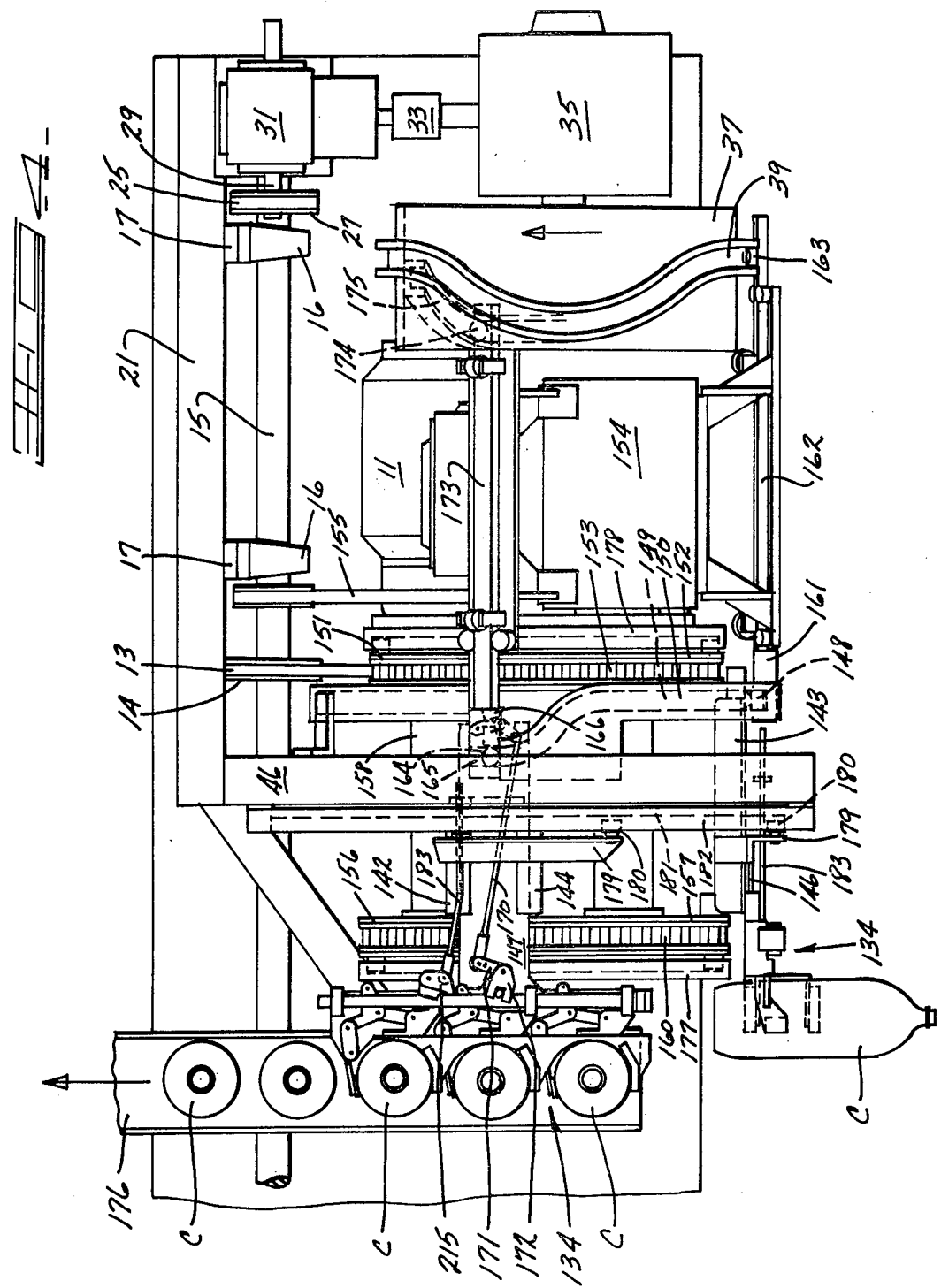

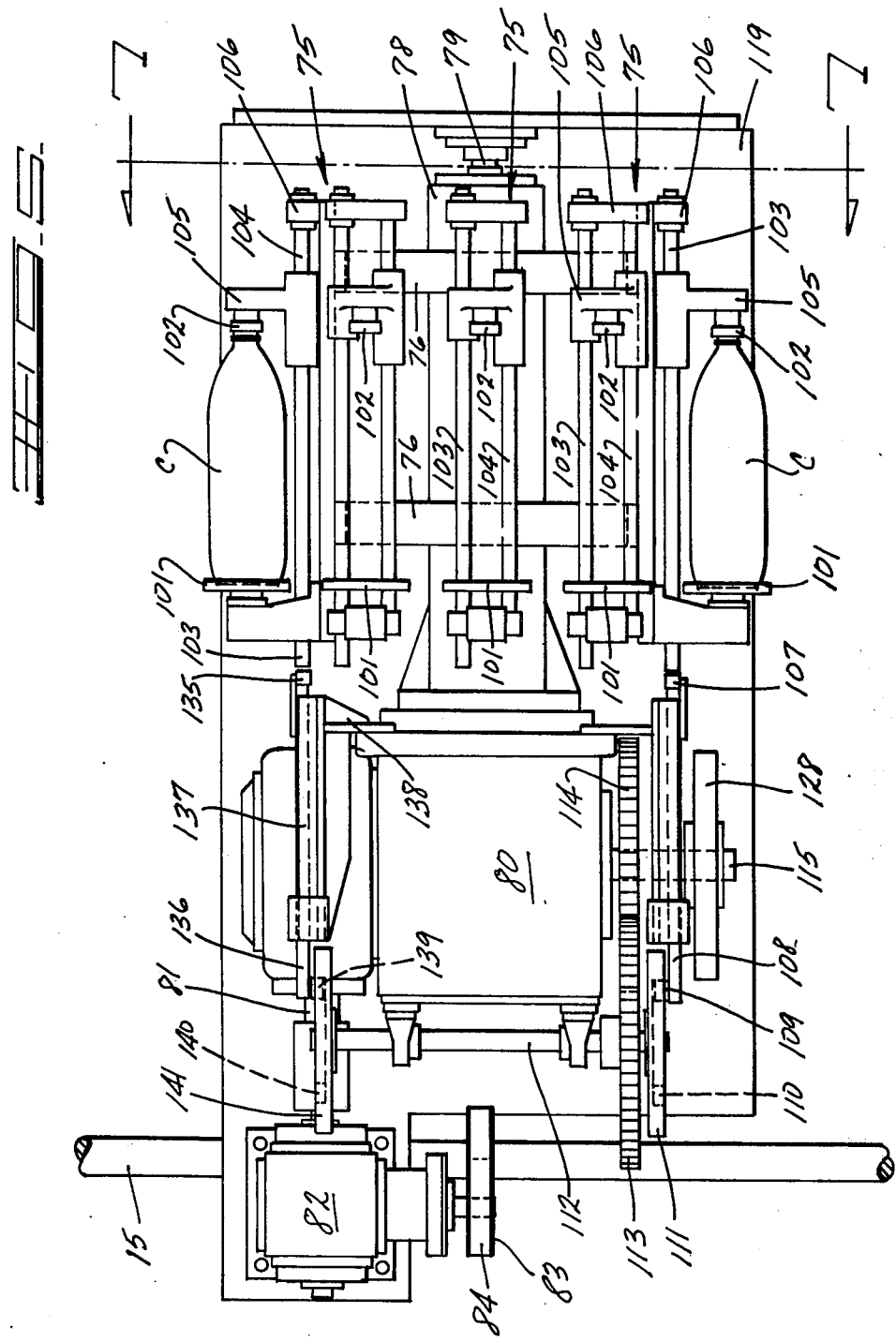

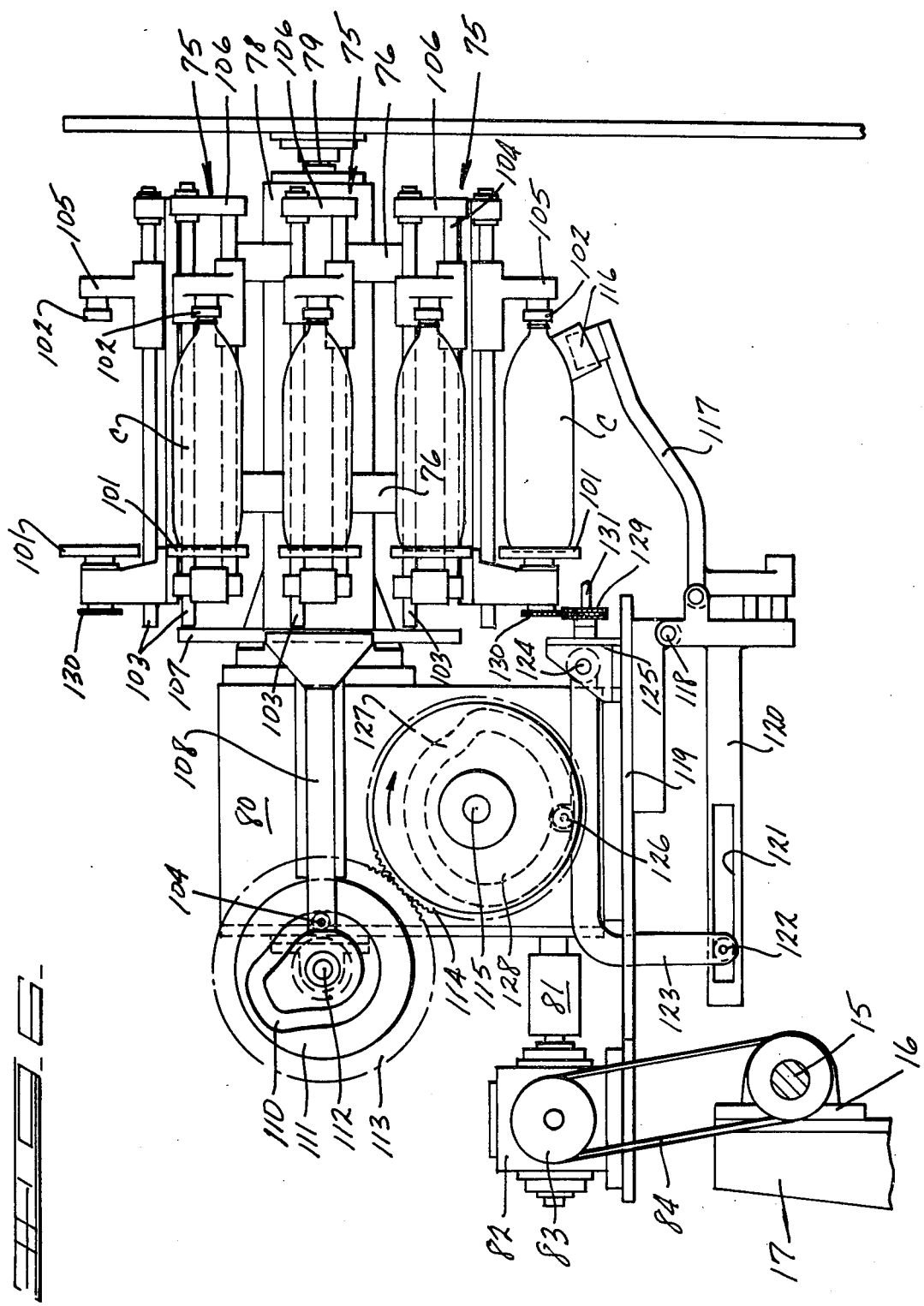

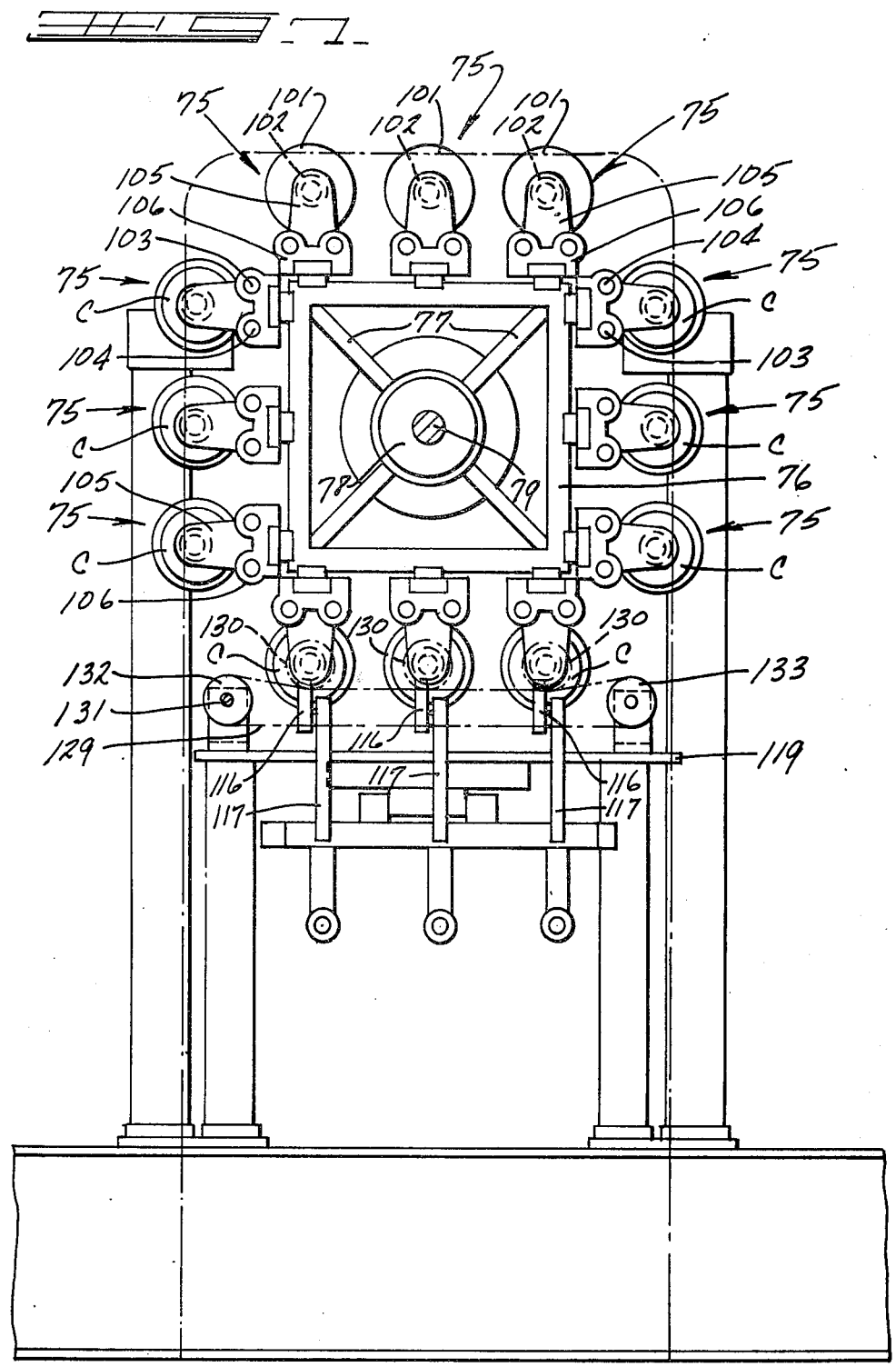

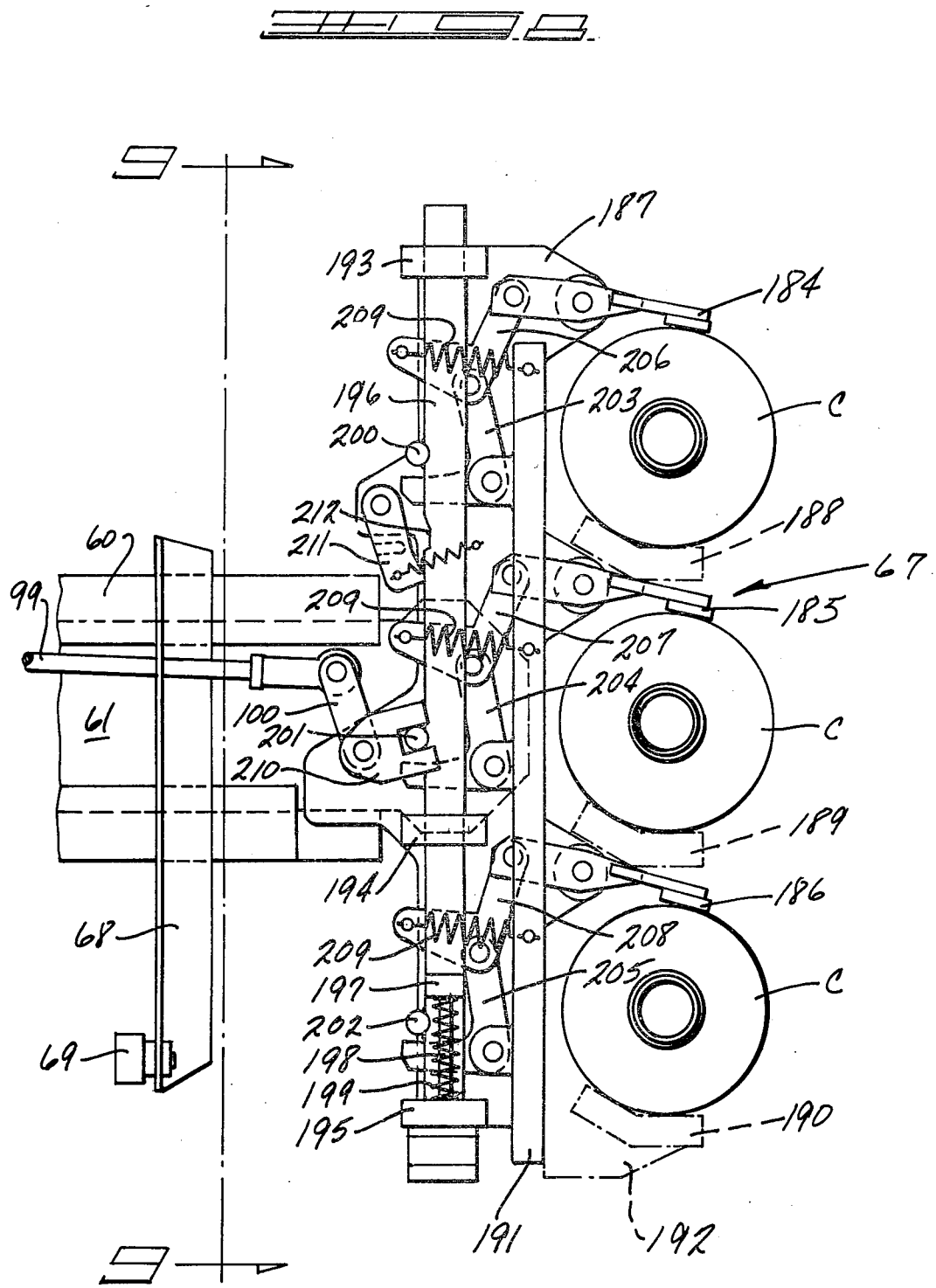

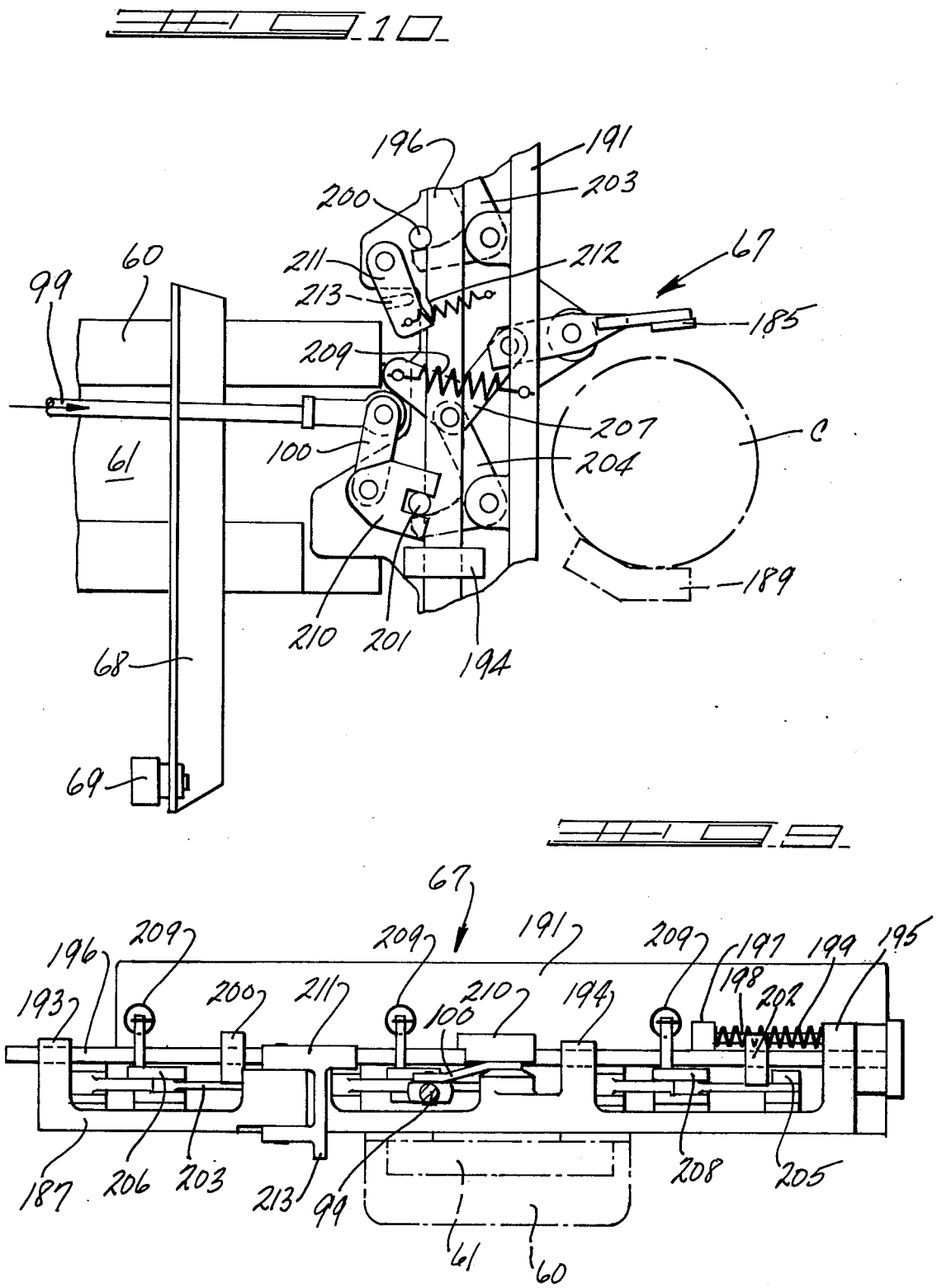

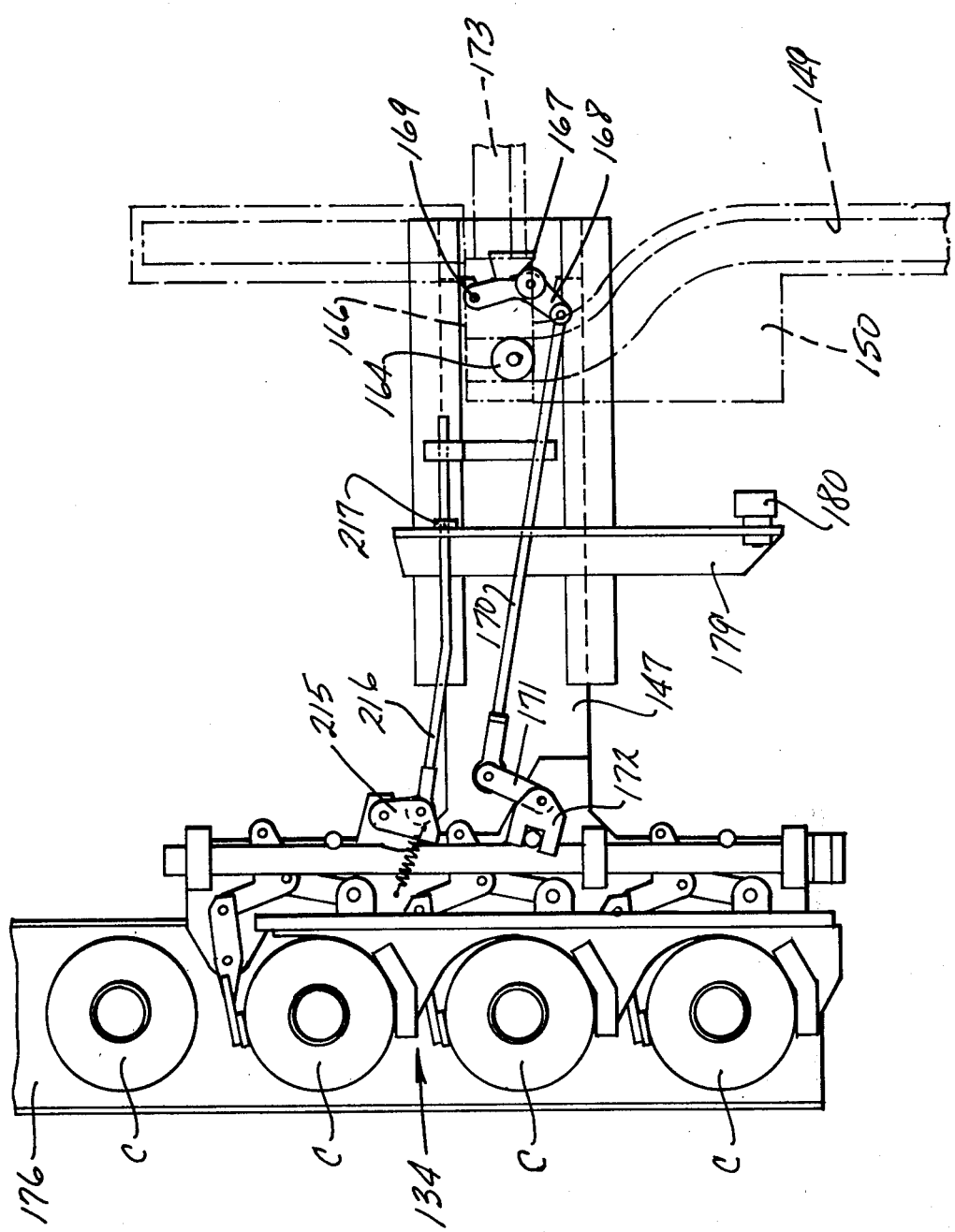

APPARATUS FOR COATING A PORTION OF A BOTTLE

This is a division, of application Ser. No. 806,138 filed June 13, 1977, now U.S. Pat. No. 4,092,447.

BACKGROUND OF THE INVENTION

Within the last few years it has become desirable to provide protective coatings on frangible glass containers, particularly containers where a pressurized liquid may be contained therein. It has also become a practice in recent years to put carbonated beverages in containers of fairly large capacity such as 32 oz. and 64 oz. bottles. Glass has an inherent strength which is well known; however, it is readily recognized that much of its strength may be lost due to the surface abrasion during the service life of the container. Typically, containers are coated shortly after they are produced with lubricious coatings which provide protection during the handling of the container from the manufacturing plant to the bottling plant where they are filled with a product. These coatings are, however, of a fairly thin character and do not exhibit a cohesive strength which would be considered capable of containing glass particles or fragments if the container were to fail in use.

With this in mind, it has become advantageous to additionally protect the surface of the containers against abrasion by providing a shrink sleeve cover of polymeric material. Typically, these materials have taken the form of foam polystyrene or foamed polyethylene. These foamed materials have an impact-absorbing strength, as well as preventing scratches or abrasions of the containers' outer surface. One disadvantage, when sleeves have been placed on bottles that contain carbonated beverages, is that the sleeve is non-transparent, thus a sleeve which extends above the shoulder of the bottle into the area of the neck will effectively mask the fill level line. We have been led to believe that the visibility of the fill level was a desirable characteristic of a container. The ultimate consumer of a product contained in the bottle prefers to see that the bottle is filled to the proper level before purchasing the container. With this in mind, the present invention deals with the method and apparatus for automatically handling bottles through a shoulder and neck area encircling coating system which will apply a relatively clear, transparent layer of organic polymeric material. This coating, along with the heat shrinkable thermoplastic sleeve, will provide a container which has substantially all of its external surface provided with a covering which will prevent abrasions of the external surface of the container and have the additional advantage of preventing substantial glass fragment scattering upon breakage of the container with its pressurized contents.

U.S. Pat. No. 3,760,968 shows a sleeve-like cover which in one form provides a sleeve cover for the main body portion of the container. Another U.S. Pat. No. 3,950,199, assigned to the assignee of this application, shows a neck and shoulder coating head which essentially is the same as that utilized in the present invention; however, it being understood that the present invention is directed to the machine and process for handling the containers into and through the coating process with return of the coated containers to a conveyor, all of the foregoing operations being carried out automatically in proper timed sequence.

SUMMARY OF THE INVENTION

This invention relates to apparatus for applying an encircling coating on a selected portion of a plurality of generally cylindrical articles in which a means is provided for moving a single line group of articles while in an upright position to a first position from which the articles will be transferred, as a group, to a supporting turret which will receive the containers in a horizontal attitude. The receiving turret will index through an arc of 90° while maintaining the group of articles with their axes horizontal. Each of the articles is rotated in the turret and the coating material is applied to the group of articles while being supported and rotated in the turret. The articles will then be moved to upright position and released to a conveyor carrying the group from the coating process.

BRIEF DESCRIPTION OF THE DRAWINGS

FIG. 1 is a top plan view of the coating apparatus of the invention;

FIG. 2 is a front elevational view of the apparatus of FIG. 1;

FIG. 3 is a top plan view of the inlet side of the apparatus of FIG. 1 on an enlarged scale illustrating the container grasping means in grasping position;

FIG. 4 is a view of the exit side of the apparatus of FIG. 1 on an enlarged scale;

FIG. 5 is a plan view of the container supporting turret;

FIG. 6 is a side elevational view of the apparatus of FIG. 5;

FIG. 7 is a sectional view taken at line 7—7 of FIG. 5;

FIG. 8 is a plan view of the bottle grasping mechanism at the loading side;

FIG. 9 is a cross-section taken at 9—9 of FIG. 8;

FIG. 10 is a plan view of the central portion of the grasping means of FIG. 8 on an enlarged scale and in open position; and FIG. 11 is a plan view of the grasping means at the unloading side.

DETAILED DESCRIPTION OF THE DRAWINGS

Generally speaking, the apparatus of the invention is for the purpose of applying a polymer coating of a few mils thickness about the shoulder and neck area of a glass container. The apparatus is such that it will perform the handling of incoming bottles, placing the bottles in chucks for indexing through the coating station and returning the bottles to an outgoing conveyor, all automatically under the control of a single drive motor. Three bottles or containers are coated simultaneously and handled simultaneously by the apparatus. An example of the area of a bottle that is to be coated by the present apparatus may be found in U.S. Pat. No. 3,950,199 granted to H. R. Lucas on Mar. 15, 1974.

With reference to FIGS. 1 and 2 of the drawings, a general description of the apparatus will follow.

A machine base 10 supports a main drive motor 11. The motor 11 has a main output pulley 12, as best seen in FIG. 2, drivingly engaging a belt 13. The belt 13 drives a pulley 14. The pulley 14 is mounted to a horizontal shaft 15 that extends substantially the full length of the apparatus. The shaft 15 is supported at various points along its length by a plurality of bearing member 16. The bearing members 16 are anchored to vertical support members 17 which extend between lower horizontal rails 18 and 19 and upper horizontal rails 20 and 21. The shaft 15, at its extreme ends, carries drive pulleys 22 and 23. The pulleys 22 and 23, through belts 24 and 25, drive pulleys 26 and 27 positioned vertically thereabove. The pulleys 26 and 27 positioned vertically thereabove. The pulleys 26 and 27 each are connected, respectively, to drive shafts 28 and 29 which extend from gear boxes 30 and 31 whose output shafts 32 and 33 are coupled to gear boxes 34 and 35. The gear boxes 34 and 35 drive cylindrical drums 36 and 37. The drum 36 carries a cam track 38 on its outer surface which cam track is continuous through the full circumference of the drum. The drum 37 also carries an external cam track 39 which is similar to the cam track 38. The drums 36 and 37 each support cam tracks 40 on the interior surface of the drum. The cam tracks 40 are essentially the same; being mirror images of each other, as are the external cam tracks 38 and 39. The drums 36 and 37 are rotated by the drive system in the direction shown by the arrows thereon.

As best shown in FIG. 2, the gear boxes 34 and 35 are supported from the base 10 by pillars 41 and 42. Another pair of vertical pillars 43 and 44 extending from the base 10, support overhead cross beams 45 and 46. The pillars 43 and 44, generally speaking, have comparable support pillars at the rear supporting the other ends of the cross beams 45 and 46. It should be understood that the rails 20 and 21 appear both at the forward and rearward side of the machine and, in effect, form a box-like rectangular structure which supports much of the machinery that is mounted above the level of the base 10 machine.

With particular reference to FIGS. 1–3, the shaft 15 has a pulley 47 mounted thereon near the left end thereof which drives a belt 48. The belt 48 drives the input shaft (not shown) to a Ferguson indexing drive 49. The Ferguson drive 49 has an output shaft 50, best seen in FIG. 3. The output shaft 50 carries a pair of spaced-apart sprockets 51 and 52 mounted thereto. The sprockets 51 and 52 carry drive chains 53 and 54 which extend thereover and drive a second pair of sprockets 55 and 56 mounted at either end of an idler shaft 57. Three guide members 58, 59 and 60 extend between the two chains 53 and 54 and are connected thereto so as to move with the chains as they are indexed by the Ferguson drive 49. The guide members they are indexed by the Ferguson drive 49. The guide members 58–60 support slides 61, 62 and 63 respectively, which are reciprocable relative to their guide members. The slides 61–63 each have cam follower rollers 64 on the left ends thereof, as viewed in FIGS. 1, 2 and 3. The rollers 64 are adapted to ride within a stationary cam track 65. The cam track 65, as best shown in FIG. 3, has an offset gap 66, the function of which will be explained later. The forward end, or the end opposite the roller 64, of each of the slides 61–63, carries bottle grasping jaw mechanisms, generally designated 67, of which there are three. These jaw mechanisma are identical and are shown retracted in FIG. 1 and in FIG. 3 are shown moved toward a group of three containers C and with their jaws closed about the containers in preparation for transfer of the group of containers upon the next index of the supporting chains.

The members 58–60 each have an angle bracket 68 connected thereto, to the free end of which are connected follower rollers 69. The follower rollers 69 are guided in a box cam slot formed in a cam 70. In this manner the orientation of each of the members 58–60 relative to the three positions that the jaws will take during the operation of the apparatus will be assured and the jaws will effectively be prevented from swinging or swaying uncontrollably through their movement from the position of grasping the containers, as shown in FIG. 3, to the second position where the containers are moved through 90° about a horizontal axis such that the containers will be positioned with their axes horizontal and one above the other. The third set of jaws, in which the containers have been taken or released therefrom, are in an idle position ready to be moved to the top position where they will grasp another set or group of containers. The Ferguson drive, as would be expected, will move through an angle of 120° during each index.

As previously mentioned, there is a gap in the cam 35 at position 66 and the follower 64 for the slides 61–63 must be shifted when the follower reaches this gap. The transfer of the follower 64 across this gap is effected by a slide 71 which takes the form of a block with a slot therethrough within which the follower 64 may move. This slide 71 is carried at the forward end of an elongated bar 72 which in turn has a follower roller 73 at its rearward end that rides in a cam track 40 positioned on the inner circumference of the drum 36. The bar 72 is guided and retained by a plurality of side and top-engaging rollers 74. Just prior to the arrival of the slide 60, to the position shown in FIG. 3, the slide 71 will be in retracted position such that its slot will be in alignment with the slot formed in the cam 65, so that when the drive 49 indexes the chains and the guide member 60 to the position shown in FIG. 3, the follower 64 will become trapped within the slide 61. At this time, the slide 71 will be shifted to the position shown in FIG. 3 by the cam 40, thus moving the follower 64 and the slide 62 toward the group of containers. At this time also the jaws carried by the bottle grasping mechanism will close about the containers. The details of the jaw mechanisms will be described later in connection with FIGS. 8–11. As can be seen when viewing FIG. 3, the cam track 65 will guide the slide 62 toward the left as the slide 62 is indexed by the Ferguson drive 49. With this motion, the grasping jaws 67 will retract to the left as they are turned through an angle of approximately 90° to the position presently occupied by the slide 61. In this position, the containers C will be ready to be received in a set of carriers, generally designated 75. The carriers 75 are described in some detail in U.S. Pat. No. 2,739,531 with some slight modification having been made. Particular attention is called to the mechanism shown in FIG. 4 of that patent and the accompanying description.

As shown in FIGS. 5–7 of the present application, the carriers, of which there are four sets of three, are mounted to a generally square frame 76, mounted by spider arms 77 to a central hub 78. The central hub 78 is mounted for rotation about its horizontal axle 79, with the rearward portion of the axle 79 being connected to a Ferguson indexing drive 80. The indexing drive 80 is driven through a shaft 81 which extends horizontally from a gear box 82. The gear box 82 in turn is driven by a pulley 83, belt 84, and pulley 85 which is carried by the main drive shaft 15.

The containers C to be coated, as best seen in FIG. 1, move toward the coating mechanism while positioned upright on a moving conveyor 86, moving in the direction of the arrow shown thereon. A rotating worm 87 engages the sides of the containers and spaces the containers at evenly spaced intervals so that when the containers arrive at the area of the grasping mechanism 67 they will be spaced so as to be easily grasped by the mechanism 67. In order for the grasping mechanism 67 to release the containers C to the carriers 75, the slide 61, as viewed in FIGS. 2 and 3, must be shifted to the right to place the containers in position to be engaged by the carriers 75. In order to move the slide 61 to the right, a slide 88, similar to the slide 71 previously described, is mounted to the forward end of a bar 89. The bar 89 is reciprocally mounted with side-engaging rollers 90 confining the bar to such longitudinal reciprocatory motion. A cam follower 91 connected adjacent the left-hand end of the bar 89 will follow in the cam track 38 carried on the exterior of the drum 36. The follower 91 and bar 89 will be shifted to the right by the cam track 38 and when the containers are to be released from the mechanism 67, a cam plate 92, carried on the surface of the drum 36, will engage a follower roller 93.

The position of the cam track 38, as well as the cam plate 92, are shown out of actual position for the purpose of illustration. The drum 36 will be rotated at a given speed depending upon the speed of the other mechanisms and the function of these cams will be apparent from the following.

With reference to FIG. 3, the follower roller 93 is carried at one end of an arm member 94 which is pivoted intermediate its length at 95 to the end of bar 89. A connecting link 96 is connected to the other end of the arm member 94 and to the end of a second arm member 97 which is pivotally mounted at 98 adjacent the forward end of the bar 89. The arm member 97 at its end opposite the end that is connected to the link 96 is provided with an engaging member 98. The member 98, upon actuation of the arm 97 by the link 96, will move an actuator link 99 carried by the slide 61 with the forward end of the actuator link 99 connected to a crank arm 100 of the clamping mechanism 67. It should be understood that the shifting of the actuator link 99 to the right, as viewed in FIG. 3, will effect the opening of the grasping members to permit the release of the members to the carriers 75. When the rod 89 moves forward, timing of the opening and closing of the carriers 75 is such that they will be ready to receive the containers C, at the point in time when the containers are presented thereto. The carriers 75, as best seen in FIGS. 5 and 6, are carried in groups of three on each side of the square frames 76. Each carrier 75 is composed of a bottom-engaging plate 101 and a neck or finish gauging 102. Both the bottom plate and the finish holder are operatively mounted to a pair of parallel, generally horizontal, rods 103 and 104. It should be understood that all of the carriers 75 are essentially identical. In the actual construction of these carriers, the bottom plate 101 is fixed relative to the rods 104, with the rod 103 extending through and being relatively movable with respect thereto. The finish holder 102 is carried by a head member 105 in the form of a casting through which both the rods 103 and 104 extend. A portion of the head member 105 that surrounds the rod 103 is adjustably fastened to the rod 103 and at its extreme end, as viewed in FIG. 5, it is fixed to a cross-head 106.

Each of the head members 105 contain spring means therein which will effectively urge the finish holder 102 in the direction of the bottom plate 101. The carriers 75 are actuated by engagement of the left-hand ends of the rods 103 by a bar 107 when the carriers are in the bottle-receiving position at the left side in FIG. 1 and as seen in FIG. 6. The bar 107 is carried at the forward end of a horizontal slide 108. Its rearward end, as viewed in FIG. 6, carries a cam follower roller 109. The cam follower roller 109 follows a cam track 110 formed in the face of a circular plate 111. The plate 111 is mounted to a horizontal shaft 112 which is supported by bearings mounted at the back of the indexing drive housing 80. The shaft 112 is driven by a spur gear 113 which meshes with a spur gear 114 connected to an output shaft 115 which, in effect, is driven by the drive shaft 81 which drives the Ferguson indexing drive 80.

Thus it can be seen that upon presentation of bottles to the carriers 75, shown to the left of FIG. 7, and by actuation of these carriers by the bar 107, the containers may be loaded therein. Operation of the indexing drive through 90° will move the loaded containers to a position where their horizontal axes will now lie in a single horizontal plane at the lower side of the frame 76. In this indexed position the containers are ready to be coated with the polymer in essentially the same manner as taught in the previously referred-to U.S. Pat. No. 3,950,199 issued to H. R. Lucas. This Lucas patent shows a reservoir containing a supply of organic polymeric material and with rotation of the bottles in engagement with the reservoir will result in the coating of the portion of the container which is contacted by the upper, open end of the fluid reservoir.

With reference to FIGS. 6 and 7, there is schematically shown a reservoir 116 carried at the end of a support arm 117 that is pivoted at 118 to a mounting plate 119. The plate 119 is stationary and also happens to serve as the mount for the gear box 82. An arm 120, extending to the left, as viewed in FIG. 6, is provided with an elongated slot 121 therein, within which an actuator drive roller 122 is mounted. The roller 122 is connected to one end of an arm 123 which has its other end pivoted at 124 to a fixed bracket 125. The arm 123 describes generally a right angle with the roller 122 being fixed adjacent one end thereof and a cam follower roller 126 being carried intermediate the length of the arm. The cam roller 126 rides in a cam slot 127 formed in a disc 128 carried on the shaft 115.

In proper timed sequence and upon the initial driving of the shaft 15 through the various reduction gears and gear boxes, the reservoir 116 will be placed into and out of contact with the shoulders of the containers C that are positioned on the lower side of the frame 76. When the containers are in this position, they are rotated about their axes by engaging a driven chain 129 by a sprocket 130 carried by each holder, for driving the bottom plate 101. While only a few of the holders are shown as having a sprocket, all of them will have drive sprockets. The chain 129 may be continuously driven by any suitable motor or drive connected to a shaft 131 of a drive sprocket 132. An idler sprocket 133, schematically shown in FIG. 7, completes the drive system for the chain 129. The total circumference of the container area that is engaged by the reservoir 116 is thereby coated because the holders or carriers are in the coating station for a period of time to be rotated several times. The reservoir, however, will be placed against the container for a time sufficient to make one complete cycle.

After the containers have been coated, the spider arms 77 and the frame 76 will be indexed through 90° in a counter-clockwise direction as viewed in FIG. 7, at which time the coated containers will be at the right side of the frame 76 with their axes defining a vertical plane at the right side thereof. When the containers have arrived at this position, they will be released from the carriers 75 and received by a bottle-grasping mechanism 134. All of the grasping means 134 which are mounted to the right side of the machine, as viewed in FIGS. 1 and 2 and as shown in somewhat enlarged detail in FIG. 4, are identical.

Again, as with regard to the description of the grasping mechanism 67, there are three sets of jaws in each group of grasping mechanisms and there are three groups of grasping mechanisms 134 used on the right, or "unload" side of the machine. When the coated containers have arrived at the right side of the frame 76, as viewed in FIG. 7, the three carriers 75 will be simultaneously opened through engagement of the horizontal rods 103 by a vertical bar 135 (see FIG. 5). The bar 135, like the bar 107, is carried at the forward end of a slide 136 which is guided in a retainer 137 mounted to the side of the indexing drive 80 by a bracket 138. The left-hand end of the slide 136 carries a cam follower roller 139 which will follow a cam track 140 formed in the face of a plate 141. The plate 141 is mounted to the horizontal shaft 12 and rotated thereby. Release of the bottles from the carriers 75 by the operation of the bar 135 is done in synchronism with the arrival of the grasping mechanism 134 to the position shown in FIG. 2. The grasping means, when in this position, will be opened and receive the containers C therein. An operating rod 142 of the grasping mechanism 134 is manipulated and causes the fingers of the grasping mechanism to close about and engage the sides of the containers C.

The grasping mechanisms 134, shown in FIGS. 2 and 4, are supported by guide members 143, 144 and 145. The guide member 143 carries a slide 146 to which is mounted one of the grasping mechanisms 134. The guide member 144 carries a slide 147 to which is mounted another set of the grasping mechanisms 134. The slide 143 carries a cam follower roller 148, as best seen in FIG. 4, which rides within a cam track 149 formed on the underside of a cam plate 150. The cam plate 150 extends generally circumferentially about the horizontal axes of a pair of sprockets 151 and 152. The sprockets 151 and 152 are essentially the same as sprockets 55 and 56 described previously with respect to FIG. 3. The sprockets 151 and 152 are interconnected by a drive chain 153. The sprocket 152 is indexed by a Ferguson indexing drive 154 which is driven from the shaft 15 through a drive belt 155. A second pair of sprockets 156 and 157 are likewise driven by the indexing drive 154 with these sprockets 156 and 157 being mounted to the ends of shafts 158 and 159. A second chain 160 joins the two sprockets 156 and 157. As in the case of the guide members 58–60 of FIG. 3, the guide members 143–145 are mounted between the two chains and fixed thereto such that they move with the movement of the chains.

With the mechanism positioned as shown in FIG. 4, the container at the bottom of the figure has been grasped by the grasping mechanism 134 and retracted by engagement of a slide 161 with the cam follower roller 148. The slide 161 is on the forward end of an elongated horizontal bar 162 with the opposite end of the bar 162 having a cam follower roller 163 connected thereto. The cam follower roller 163 will move within the cam track 39 carried by the drum 37. If the container is retracted, as previously stated, to the position shown in FIG. 4, the index drive 154 will move the guide member 143 to the position of the guide member 142. This will result in the slide 146 moving to the left to the position of the slide 147 shown due to the contour of the cam track 149. In actual practice, the position of the grasping mechanism 134 in FIG. 4 is just prior to the completed movement into the fully indexed position, since the grips or jaws are still closed. However, once the grasping mechanism 134, which is connected to the slide 147 arrives in the position shown, the slide 147 will have been moved forward and its cam follower roller 164 will enter a cam slot 165 formed in a slide 166.

The slide 166, in addition to having the cam slot 165 formed therein, is provided on the underside thereof with an arm-engaging cam member or abutment 167. The slide 147, as do the other comparable slides on the "unload" side of the machine, also carries an arm 168 that is pivotally connected thereto at 169. The arm 168 is adapted to engage the cam member 167 when the guide member 144 and slide 147 move into the position shown in FIG. 4. This will effectively rock the arm 168 in a clockwise direction about its pivot 169 to move a link 170 to the left, as viewed in FIG. 4, and operate a crank arm 171 and a bifurcated, pivoted ctuator 172 in a counter-clockwise direction to effectively open the jaws of the grasping mechanism 134. Upon opening of these grasping mechanisms 134, the slide 147 will be moved to the right by the slide 166 engaging the cam follower roller 164. The slide 166 is carried on the left-hand end of a bar 173 which carries a cam follower roller 174 adjacent its right-hand end. This cam follower roller 174 rides within a cam track 175 carried on the inner surface of the drum 37. It can readily be seen that retraction of the bar 173 will result in the grasping mechanism 134 being moved to the right, as viewed in FIG. 4, and the containers that are thus released will be moved away from the machine on a conveyor 176 moving in the direction of the arrow shown therewith.

The path of movement of the guide members 58–60 which carry the grasping mechanism 67, are guided in their paths by a pair of horizontally spaced, vertically oriented, box cams 7 and 8. These cams 7 and 8 guide the chains 53 and 54 which carry followers in their orbital path about the four sprockets 51, 52, 55 and 56. In a like manner, a pair of horizntally spaced, vertical cams 177 and 178 guide the chains 153 and 160 and the guide members 143–145. Each of the guide members 143–145 is also provided with an angle bracket 179 which carries a cam follower roller 180 which rides within a cam track 181 of a cam member 182. The bracket 79 is welded to the guide member, but permits sliding movement of the slides thereunder. The operating rods 170 and an unlatching rod 183 for releasing the jaws of the grasping mechanism, pass through openings in the bracket 179.

It should be kept in min that the drawings are schematic, in that all the small details of the mechanism as it is actually built have not been shown. The drawings, however, clearly set forth the principles of the invention and illustrate the actual construction of the machine from a basic point of view.

The cam tracks 65 and 150 essentially are continuous except for the offset at 66 and 166 where slides 71 and 166 operate and the necessary interruptions for the slides 88 and 161 to reciprocate the grasping means 67 and 134 into and out of position to release the bottles to the carriers 75 when at either side of the coating section of the machine.

The details of a grasping mechanism is given with reference to FIGS. 8–11. The grasping means shown specifically in FIGS. 8–10 is the grasping means 67 which appears in FIG. 1 at the left-hand side. This mechanism was described somewhat in detail in the description of FIG. 3. The mechanism 67 is comprised of three movable fingers 184, 185 and 186. Each of these fingers is pivoted to a casting 187 which generally extends the full length of the grasping member 67. Casting 187 also carries fixed bottle engaging members 188, 189 and 190. The members 188-190 may be formed of a material which will not scratch or abrade the containers as well as the actual engaging pads of the movable fingers 184-186. Each of the fingers is shown in closed position in FIG. 8.

The casting 187 carries a vertically extending plate 191 to which the fixed fingers are actually mounted by the interposition of a horizontal portion 192, shown in dotted line in FIG. 8. The casting 187, as perhaps best shown in FIG. 9, is provided with three upstanding guides 193, 194 and 195. These gudes are provided with rectangular openings therethrough, through which an atuator bar 196 extends. The actuator bar 196 has an abutment 197 fixed to the upper face thereof adjacent the right-hand end, as viewed in FIG. 9. The abutment 197 carries a horizontal, extending pin 198 which serves as a guide pin for a coil spring 199. The spring 199 serves to bias the bar 196 toward the left, as viewed in FIG. 9, or toward the top, as viewed in FIG. 8. The bar 196 also carries three spaced, vertical, actuating members 200, 201 and 202. These members take the form of short cylinders that are welded to the side of the bar 196. The function of each of these actuating members is to engage one end of crank levers 203, 204 and 205. These crank levers 203-205 are pivotally mounted, intermediate their length, to the back of the vertical plate 191. Those ends of the levers which are remote from the actuator mebers 200-202 are pivotally connected to intermediate links 206, 207 and 208. The links 206-208 in turn are pivotally connected to the rearward ends of the movable fingers 184-186 respectively. Each of the intermediate links is connected to a tension spring 209 so as to, in effect, bias the linkage mechanism such that the fingers 184-186 will be biased into closing position relative to the stationary pads 188-190.

In the position shown in FIG. 8, the fingers 184-186 are in closed position and the compression spring 199 will maintain the bar 196 in the position shown. This is the position where the grasping mechanism 67 has grasped the bottles preparatory to transferring them to the position where they will be received by the support turret carriers 75. It should be kept in mind that the grasping mechanism 67 is normally in the open position except during actual transfer of the grasped containers, and is placed in the open position by the actuator link 99 connected to the crank arm 100. The crank arm 100 moves a bifurcated member 210 that embraces the upwardly extending portion of the actuating member 201. This movement is illustrated, when considering the position of the linkages in FIG. 10, wherein the bifurcated member 210 has been rotated clockwise so as to move the bar 196 against the spring 199. In this position, a spring-biased detent member 211 will fall within a recess 212 in the side of the bar 196. As long as the detent 211 remains in engagement within the recess 212, the bar 196 will remain in the position shown in FIG. 10 and the fingers of the grasping mechanism will remain open.

At the time that the grasping mechanism 67 is moved to the position shown in FIG. 3 by the index drive 49 and through the operation of the cam 15 and the follower 73 which is connected to the bar 72, the slide 61 will move forward carrying the grasping mechanism therewith. At this time the detent 211, which has a downwardly extending trip lever 213, will engage an abutment (not shown) which is carried on the outside of the box cam 70. When the detent member 211 is shifted clockwise from its spring-biased position, it will immediately free the bar 196 to move upwardly, as viewed in FIGS. 8 and 10, and effectively cause the fingers 184-186 to close. The fingers will stay in this position until the grasping mechanism 67 is moved through the first index movement, at which time the actuator link 99 will be actuated by the follower roller 93 engaging the cam plate 92 while at the same time the grasped containers in the grasping mechanism 67 will be moved to the right, as viewed in FIG. 3, by the cam follower 91 moving in the track 38. The connecting link 96, as shown in FIG. 3, is spring-biased by a spring 214 surrounding the member intermediate its length and positioned between an abment carried by the link and a fixed abutment connected to the supporting members that extend from the stationary housing of the indexing drive 49. As previously explained, the containers will be released to the turret for handling through the coating process.

After the containers are coated, it is necessary that they be removed from the turret and returned to the outgoing conveyor 176. The mechanism that does this task is the grasping mechanism 134 which, generally speaking, is identical to the grasping mechanism 67, with the exception that a spring-biased detent 215 is actuated in the proper sequence by a connecting rod 216 connected thereto at one end with the opposite end of the rod 216 passing through an opening formed in the angle bracket 179. A stop member or collar 217 carried by the rod 216 will engage the angle bracket 179 when the slide 147 will have moved forward to the position where the fingers of the grasping mechanism will be in position to grasp the containers that have been coated. At this point in time, it should be understood that the containers will have their axes horizontal and positioned toward the front of the mechanism as shown in FIG. 4. It is at this time when the slide 147 is moved forward toward the three containers mounted in the turret that the collar 217 will engage the angle bracket 179, causing the grasping mechanism 134 to close and grasp the contaners. The grasping mechanism 134 will then be withdrawn to the position shown in FIG. 4 by the action of the cam follower 163 riding in the cam track 39, as previously explained. Upon indexing of the grasping mechanism from the position on the front in FIG. 4, to the position illustrated in FIG. 11, the cam follower roller 164 which is carried by the slide 147 will move to the position shown in FIG. 11 and then a little bit further with the completion of the index movement. The position shown in FIG. 11 is that position of the follower 164 just prior to the opening of the grasping mechanism 134 and just prior to the withdrawal of the grasping mechanism 134 by operation of the bar 173 and slide 166 carried at the forward end of the bar 173.

As can be seen when viewing FIG. 11, completion of the indexing movement will move the lever 168 so that its actuator will engage and be displaced by the cam member 167. It should be understood that the cam member 167 is carried with the slide 166 and upon completion of the indexing movement bringing the cntainers C into position over the moving conveyor 176, the bifurcated actuator 172 will be operated by the arm 168 which is pivoted at 169, and upon operation of the actuator 172 the clamping fingers will release the containers, at which point in time the slide 166 will move to the right, as viewed in FIG. 11, so as to align the follower roller 164 with the continuing cam track 149 of the cam plate 150.

It has been found that in order for the operation of this mechanism to perform the motions in handling of the containers with a smooth and flawless motion, that the conveyor 176 be moving at the same linear rate as the rate of movement of the index mechanism which brings the grasping mechanisms 134 to the position overlying the conveyor 176. In this manner, the containers are released to the conveyor without any change in the velocity of the containers. By the same token, containers arriving on the conveyor 86, likewise will be picked up and grasped by the mechanism 67 and removed from the conveyor 86 at the same velocity as the containers are moving on the incoming conveyor. To this end, the drive for the conveyors and the indexing of the grasping members are interrelated to assure smooth pick-up and release of containers from and to the conveyors.

We claim:

1. Apparatus for applying an encircling coating on a glass container comprising:
    means for moving containers in spaced-apart series to a first position:
    first means at said first position for grasping a plurality of said containers at a time;
    means connected to said grasping means for indexing said grasping means and removing the containers from said means for moving the containers, said indexing means moving the containers through an arc of 90° from the vertical to the horizontal;
    means for simultaneously receiving the plurality of horizontally oriented containers between a plurality of neck and base engaging chucks;
    means connected to said chucks for moving said chucks, as a group, through a 90° arc;
    means for rotating said chucks about their horizontal axes;
    coater means movable into engagement with the container while being rotated;
    second means for grasping the coated containers and removing them from the chucks;
    a moving conveyor extending from the application area; and
    means connected to said second grasping means for releasing the containers to said conveyor.

2. The apparatus of claim 1 wherein said grasping means comprises a shiftable member having a plurality of fixed fingers at one end thereof, a plurality of movable fingers, complementary to said fixed fingers and carried by said shiftable member.

3. The apparatus of claim 2 wherein said movable fingers are spring-biased into grasping position and means responsive to shifting of said member for releasing said movable fingers.

4. The apparatus of claim 3 wherein said means responsive to shifting of the member comprises a spring-biased latch and a spring-biased finger actuator carried by said member, and a locking recess formed in said actuator within which said latch is normally seated when the fingers are open.

5. The apparatus of claim 4 wherein said means for releasing said latch comprises a stationary abutment engageable by said latch upon movement of said shiftable member into position to grasp a group of articles.

6. Apparatus for applying an encircling coating on a selected portion of a plurality of generally cylindrical articles comprising:
    conveyor means for moving a group of said articles in upright position at spaced intervals to a first position;
    first means adjacent said first position for grasping the group of articles by side-engaging means;
    drive means connected to said first means for withdrawing the group from the first position and moving the group through an arc of 90° to present the group with their axes horizontal;
    a generally horizontal article group supporting turret;
    means for releasing the group from said first means to said turret;
    means for indexing the turret through 90° while maintaining the group of articles with their axes horizontal;
    means for rotating said articles while in said turret;
    means for applying a coating material to the group of articles while supported in said turret;
    said means for indexing carrying an already coated group of articles to an unloading position;
    second means for grasping the group that has been coated;
    drive means connected to said second means for withdrawing the group from said turret and moving the coated group through an arc of 90° to present the group with their axes vertical; and
    means for releasing said group of articles to a conveyor for carrying the group from the coating apparatus.

7. The apparatus of claim 6 wherein said grasping means comprises a shiftable member having a plurality of fixed fingers at one end thereof, a plurality of movable fingers, complementary to said fixed fingers and carried by said shiftable member.

8. The apparatus of claim 7 wherein said movable fingers are spring-biased into grasping position and means responsive to shifting of said member for releasing said movable fingers.

9. The apparatus of claim 8 wherein said means responsive to shifting of the member comprises a spring-biased latch and a spring-biased finger actuator carried by said member, and a locking recess formed in said actuator within which said latch is normally seated when the fingers are open.

10. The apparatus of claim 9 wherein said means for releasing said latch comprises a stationary abutment engageable by said latch upon movement of said shiftable member into position to grasp a group of articles.

11. Apparatus for applying an encircling coating on a selected portion of a plurality of generally cylindrical articles comprising:
    conveyor means for moving a group of said articles in upright position at spaced intervals to a first position;
    first means adjacent said first position for grasping the group of articles by side-engaging means;
    drive means connected to said grasping means for withdrawing the group from the first position and moving the group through an arc of 90° to present the group with their axes horizontal;
    a generally horizontal article group supporting turret;

means for indexing the turret through 90° while maintaining the group of articles with their axes horizontal;

means for applying a coating material to the group of articles while supported and rotated in said turret;

second means for grasping the group that has been coated; and means connected to said second means for releasing said group of articles to a conveyor for carrying the group from the coating apparatus.

* * * * *